US009813865B2

(12) United States Patent
Kim et al.

(10) Patent No.: US 9,813,865 B2
(45) Date of Patent: *Nov. 7, 2017

(54) NETWORK-INITIATED CONTROL METHOD AND APPARATUS FOR PROVIDING PROXIMITY SERVICE

(71) Applicant: LG ELECTRONICS INC., Seoul (KR)

(72) Inventors: Hyunsook Kim, Anyang-si (KR); Jaehyun Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,776

(22) Filed: Jun. 1, 2016

(65) Prior Publication Data
US 2016/0286354 A1 Sep. 29, 2016

Related U.S. Application Data

(63) Continuation of application No. 14/361,261, filed as application No. PCT/KR2012/011159 on Dec. 20, 2012, now Pat. No. 9,380,623.
(Continued)

(51) Int. Cl.
H04B 7/00 (2006.01)
H04W 4/02 (2009.01)
(Continued)

(52) U.S. Cl.
CPC ........... H04W 4/023 (2013.01); H04L 47/122 (2013.01); H04W 4/008 (2013.01); H04W 12/06 (2013.01);
(Continued)

(58) Field of Classification Search
None
See application file for complete search history.

(56) References Cited

U.S. PATENT DOCUMENTS

2007/0230423 A1 10/2007 Yoshida et al.
2011/0098043 A1* 4/2011 Yu .................. H04W 60/00
455/435.1
(Continued)

FOREIGN PATENT DOCUMENTS

CN 1527621 9/2004
CN 1527623 9/2004
(Continued)

OTHER PUBLICATIONS

The State Intellectual Property Office of the People's Republic of China Application Serial No. 201280062550.5, Office Action dated Jun. 1, 2016, 17 pages.
(Continued)

Primary Examiner — Mohammed Rachedine
(74) Attorney, Agent, or Firm — Lee, Hong, Degerman, Kang & Waimey

(57) ABSTRACT

The present invention relates to a wireless communication system. More particularly, disclosed are a network-initiated control method and an apparatus for providing a proximity service (ProSe). A method for supporting ProSe between a plurality of terminals at a network node of a wireless communication system according to one embodiment of the present invention comprises: a step of acquiring base ProSe information from one or more of the plurality of terminals or from one or more of other network nodes; a step of allowing the network node to detect whether ProSe is enabled between the plurality of terminals based on the acquired base ProSe information; and a step of transmitting informa-
(Continued)

tion indicating whether ProSe is allowed or not to one or more of the plurality of terminals.

20 Claims, 7 Drawing Sheets

Related U.S. Application Data

(60) Provisional application No. 61/577,668, filed on Dec. 20, 2011, provisional application No. 61/582,412, filed on Jan. 2, 2012, provisional application No. 61/586,845, filed on Jan. 16, 2012.

(51) Int. Cl.
| | |
|---|---|
| H04W 76/02 | (2009.01) |
| H04W 40/24 | (2009.01) |
| H04W 28/02 | (2009.01) |
| H04L 12/803 | (2013.01) |
| H04W 4/00 | (2009.01) |
| H04W 12/06 | (2009.01) |
| H04W 8/00 | (2009.01) |

(52) U.S. Cl.
CPC ..... *H04W 28/0226* (2013.01); *H04W 40/246* (2013.01); *H04W 76/023* (2013.01); *H04W 8/005* (2013.01)

(56) References Cited

U.S. PATENT DOCUMENTS

| | | | |
|---|---|---|---|
| 2011/0223953 A1 | 9/2011 | Lee et al. | |
| 2011/0268101 A1* | 11/2011 | Wang | H04L 5/0053 370/344 |
| 2013/0005377 A1* | 1/2013 | Wang | H04W 72/0406 455/509 |

FOREIGN PATENT DOCUMENTS

| | | |
|---|---|---|
| JP | 2005-033536 | 2/2005 |
| JP | 2006-520158 | 8/2006 |
| JP | 2007-295541 | 11/2007 |
| KR | 10-2009-0062435 | 6/2009 |
| KR | 10-2011-0103852 | 9/2011 |
| WO | 2012061993 | 5/2012 |

OTHER PUBLICATIONS

U.S. Appl. No. 14/361,261, Office Action dated Aug. 13, 2015, 26 pages.
PCT International Application No. PCT/KR2012/011159, Written Opinion of the International Searching Authority dated Apr. 10, 2013, 13 pages.

* cited by examiner (a)

(b)

NETWORK-INITIATED CONTROL METHOD AND APPARATUS FOR PROVIDING PROXIMITY SERVICE

CROSS-REFERENCE TO RELATED APPLICATIONS

This application is a continuation of U.S. application Ser. No. 14/361,261, filed May 28, 2014, now U.S. Pat. No. 9,380,623, which the National Stage filing under 35 U.S.C. 371 of International Application No. PCT/KR2012/011159, filed on Dec. 20, 2012, which claims the benefit of U.S. Provisional Application Nos. 61/577,668, filed on Dec. 20, 2011, 61/582,412, filed on Jan. 2, 2012, and 61/586,845, filed on Jan. 16, 2012, the contents of all of which are hereby incorporated by reference herein in their entireties.

TECHNICAL FIELD

The present invention relates to a wireless communication system and, more particularly, to a network-initiated control method and apparatus for providing proximity service.

RELATED ART

Proximity service (ProSe) refers to a scheme for supporting communication between devices located physically close to each other. Specifically, ProSe is aimed to discover an application operating devices which are in proximity and, ultimately, to support exchange of data related to the application. For example, it may be considered that ProSe is applied to applications such as social network services (SNS), commerce, and games.

ProSe may be also called device-to-device (D2D) communication. That is, ProSe refers to a communication scheme for establishing a direct link between a plurality of devices (e.g., user equipments (UEs)) and thus directly exchanging user data (e.g., audio, multimedia data, etc.) between the devices without going via a network. ProSe communication may include UE-to-UE communication, Peer-to-Peer communication, etc. In addition, ProSe communication may be applied to Machine-to-Machine (M2M) communication, Machine Type Communication (MTC), etc. Accordingly, ProSe is considered as one solution to reduce the burden of a base station due to rapidly increasing data traffic. Besides, by adopting ProSe, effects such as reduction in procedures of a base station, reduction in power consumption of devices which participate in ProSe, increase in data transmission speed, increase in network capacity, load distribution, cell coverage expansion, etc. can be expected.

While adoption of ProSe is demanded as described above, a mechanism for supporting and controlling ProSe is not specifically prepared.

DISCLOSURE

Technical Problem

An object of the present invention devised to solve the problem lies in a method for detecting/discovering that ProSe is enabled between UEs, by a network when a wireless communication system supports ProSe. Another object of the present invention devised to solve the problem lies in a method for setting up a direct data path between UEs under the control of a network node. A further object of the present invention devised to solve the problem lies in a control mechanism for providing ProSe related control, e.g., charging, by receiving a direct data path setup result between UEs and ProSe related information from a UE.

It is to be understood that both the foregoing general description and the following detailed description of the present invention are exemplary and explanatory and are intended to provide further explanation of the invention as claimed.

Technical Solution

The object of the present invention can be achieved by providing a method for supporting proximity service (ProSe) between a plurality of UEs by a network node of a wireless communication system, the method including acquiring ProSe basis information from at least one UE among the plurality of UEs or at least one other network node, detecting ProSe availability between the UEs by the network node based on the acquired ProSe basis information, and transmitting ProSe permissibility indication information to the at least one UE among the plurality of UEs.

In another aspect of the present invention, provided herein is a network node for supporting proximity service (ProSe) between a plurality of UEs in a wireless communication system, the network node including a transceiver module for transmitting and receiving signals to and from an external device, and a processor for controlling the transceiver module. The processor may be configured: to acquire ProSe basis information at least one UE among the plurality of UEs or at least one other network node using the transceiver module; to detect ProSe availability between the UEs by the network node based on the acquired ProSe basis information; and to transmit ProSe permissibility indication information to the at least one UE among the plurality of UEs.

The followings may be commonly applied to the above method and the network node.

The detecting may further include discovering a ProSe-enabled UE among the plurality of UEs.

The ProSe basis information may include at least one of location information, ProSe capability information, ProSe capability enabled state information, subscriber information, preference information, device identification information, user identification information, group identification information, a list of opposite UEs, or ProSe relationship information with the opposite UEs of each of the plurality of UEs.

The ProSe basis information may include operator policy information, network ProSe capability information, and network congestion information related to each of the plurality of UEs.

The ProSe permissibility indication information may be configured as at least one of indication information indicating whether ProSe is enabled between the plurality of UEs, indication information indicating whether to perform direct communication between the plurality of UEs, or indication information indicating whether to set up a direct data path between the plurality of UEs.

The ProSe permissibility indication information may include at least one of information indicating whether ProSe is enabled, information about a use level of ProSe, information about an opposite UE for ProSe, information about a media type, a content type, an application type, or a service type for ProSe, information about directivity for ProSe, information about the amount of data for ProSe, or information about an access type for ProSe.

The ProSe permissibility indication information may include at least one of information related to Quality of Service (QoS), information related to policy control rules, or information related to charging control rules.

The ProSe permissibility indication information may further include at least one of Prose identification information, direct communication identification information, or direct data communication path identification information.

The at least one of the ProSe identification information, the direct communication identification information, or the direct data communication path identification may be defined with at least one granularity among a media or content type, an Access Point Name (APN), a QoS Class Identifier (QCI), a bearer or connection type, an application type, a service type, a destination domain, an opposite UE for communication, predefined user group information, predefined subscriber group information, predefined UE group information, or a Closed Subscriber Group (CSG).

Direct data path setup between the UEs may be initiated upon a direct data path setup request received from the at least one UE among the plurality of UEs.

Direct data path setup between the plurality of UEs may be initiated by the network node without receiving a direct data path setup request from the plurality of UEs.

The network node may receive ProSe performance result information from the at least one UE among the plurality of UEs.

The ProSe performance result information may include at least one of ProSe identification information, direct communication identification information, direct data communication path identification information, information indicating success or failure of setup of a direct data path, information about the amount of data for communication through the direct data path, information about time for which the direct data path is maintained, information about the type of media or contents communicated through the direct data path, information about directivity of the direct data path, information about an access type used for the direct data path, or information about the number and types of bearers used for the direct data path.

The network node may include one of a Mobility Management Entity (MME), a Serving GPRS (General Packet Radio Service) Supporting Node (SGSN), an evolved Node B (eNodeB) or a ProSe server.

It is to be understood that both the foregoing general description and the following detailed description of the present invention are exemplary and explanatory and are intended to provide further explanation of the invention as claimed.

Advantageous Effects

According to the present invention, a method for detecting/discovering that ProSe is enabled between UEs, by a network when a wireless communication system supports ProSe may be provided. Further, a method for setting up a direct data path between UEs under the control of a network node may be provided. Besides, a control mechanism for providing ProSe related control, e.g., charging, by receiving a direct data path setup result between UEs and ProSe related information from a UE may be provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
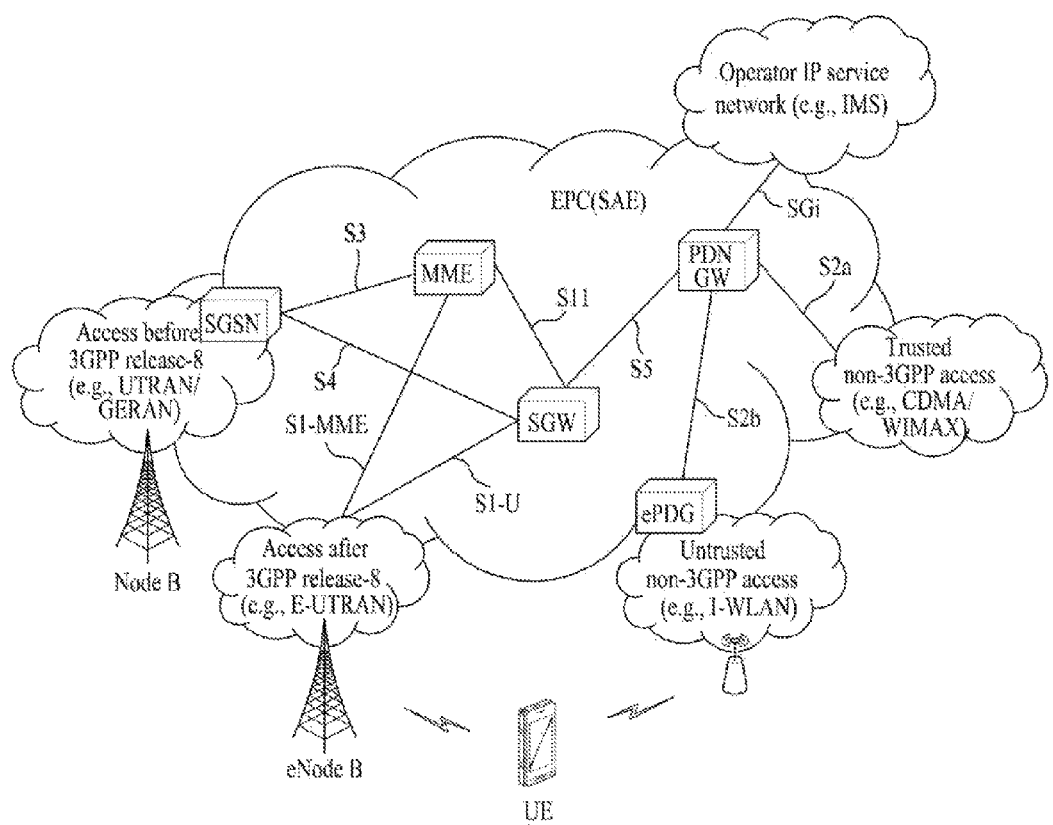
FIG. 1 is a view schematically illustrating the architecture of an Evolved Packet System (EPS) including an Evolved Packet Core (EPC)

The embodiments of the present invention described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, like reference numerals denote like elements in the drawings throughout the specification.

The embodiments of the present invention can be supported by standard documents disclosed for at least one of radio access systems such as Institute of Electrical and Electronics Engineers (IEEE) 802, 3rd Generation Partnership Project (3GPP), 3GPP Long Term Evolution (3GPP LTE), LTE-Advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various radio access systems. For clarity, the present disclosure focuses on 3GPP LTE and LTE-A systems. However, the technical features of the present invention are not limited thereto.

Terms used in the present specification are defined as follows.

UMTS (Universal Mobile Telecommunication System): A 3rd generation mobile communication technology based on Global System for Mobile communication (GSM), which is developed by 3GPP.

EPS (Evolved Packet System): A network system configured with an access network such as Evolved Packet Core (EPC), which is an Internet Protocol (IP)-based packet switched core network, LTE, UMTS Terrestrial Radio Access Network (UTRAN), etc. EPS is a network evolved from UMTS.

NodeB: A base station of a GSM/EDGE (Enhanced Data rates for GSM Evolution) Radio Access Network (GERAN)/UTRAN, which is installed outdoor and has a coverage corresponding to a macro cell.

eNodeB (evolved Node B): A base station of an LTE network, which is installed outdoor and has a coverage corresponding to a macro cell.

UE (User equipment): A user device. The UE may be referred to as a terminal, a mobile equipment (ME), a mobile station (MS), etc. In addition, the UE may be a portable device such as a laptop computer, a mobile phone, a personal digital assistant (PDA), a smartphone or a multimedia device, or a non-portable device such as a vehicle mounted device. The UE is capable of performing communication using a 3GPP spectrum such as LTE and/or a non-3GPP spectrum such as WiFi or public safety spectrum.

ProSe (Proximity service or Proximity-based service): Service enabling discovery and direct communication/communication via a base station/communication via a third device between physically adjacent devices. In this case, user plane data is exchanged through a direct data path without a 3GPP core network (e.g., EPC).

Proximity: Proximity of a UE to another UE is determined based on whether a predetermined proximity condition is satisfied. Different proximity conditions can be given for ProSe discovery and ProSe communication. The proximity condition may be configured to be controlled by an operator.

ProSe Discovery: A process that identifies that a UE is in proximity of another, using Evolved Universal Terrestrial Radio Access (E-UTRA).

ProSe Communication: A communication between UEs in proximity by means of a communication path established between the UEs. The communication path can be established directly between the UEs or routed via a local base station(s) (e.g., eNodeB(s)).

ProSe-enabled UE: A UE supporting ProSe discovery and/or ProSe communication.

ProSe-enabled Network: A network supporting ProSe discovery and/or ProSe communication.

RAN (Radio Access Network): A unit including a NodeB, an eNodeB and a radio network controller (RNC) for controlling the NodeB and the eNodeB in a 3GPP network. The RAN is present between a UE and a core network and provides connection to the core network.

HLR (Home Location Register)/HSS (Home Subscriber Server): A database having subscriber information in a 3GPP network. HSS may perform functions such as configuration storage, identity management and user state storage.

RANAP (RAN Application Part): An interface between RAN and a node (e.g., Mobility Management Entity (MME)/Serving GPRS (General Packet Radio Service) Supporting Node (SGSN)/Mobile Switching Center (MSC)) for controlling a core network.

PLMN (Public Land Mobile Network): A network configured to provide mobile communication service to individuals. PLMN can be configured on an operator basis.

NAS (non-access stratum): A functional layer for signaling and exchanging of traffic messages between a UE and a core network in a UMTS protocol stack. NAS supports mobility of the UE and supports a session management procedure for establishing and maintaining IP connection between a UE and a Packet Data Network GateWay (PDN GW).

Home NodeB (HNB): A base station of a UMTS network, which is mounted indoors and coverage of which forms a micro cell.

Home eNodeB (HeNB): A base station of an EPS network, which is mounted indoors and coverage of which forms a micro cell.

HNB (Home NodeB): Customer Premises Equipment (CPE) for providing UTRAN coverage. For details thereof, reference can be made to 3GPP TS 25.467.

HeNodeB (Home eNodeB): CPE for providing Evolved-UTRAN (E-UTRAN) coverage. For details thereof, reference can be made to 3GPP TS 36.300.

CSG (Closed Subscriber Group): A group of subscribers who are permitted to access one or more CSG cells of a Public Land Mobile Network (PLMN) as members of a CSG of an H(e)NB.

LIPA (Local IP Access): An access for an IP capable UE connected via an H(e)NB to another IP capable entity in the same residential/enterprise IP network. LIPA traffic is expected to not traverse a mobile operator's network. A 3GPP Release-10 system provides an access via an H(e)NB to resources of a local network (e.g., network located at the customer's home or enterprise).

SIPTO (Selected IP Traffic Offload): In a 3GPP Release-10 system, an operator selects a Packet data network GateWay (PGW) which is physically close to a UE in an EPC network and supports handover of user traffic.

PDN (Packet Data Network) Connection: A logical connection between a UE indicated by a single IP address (e.g., single IPv4 address and/or single IPv6 prefix) and a PDN indicated by an Access Point Name (APN).

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPPaccess network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra-operator packetdata network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control Mechanism for Providing Proximity Service (ProSe)

The present invention proposes a control mechanism for supporting proximity service (ProSe) or D2D service in a mobile communication system such as 3GPP Evolved Packet System (EPS).

Due to increase in user demands related to social network service (SNS), etc., demands for detection/discovery between physically adjacent users/devices and special application/service (e.g., proximity-based application/service) has appeared. Even in a 3GPP mobile communication system, potential use cases and scenarios of ProSe and potential service requirements to provide such service are under discussion.

The potential use cases of ProSe may include commercial/social service, network offloading, public safety, integration of current infrastructure services (to assure the consistency of the user experience including reachability and mobility aspects). Additionally, use cases and potential requirements for public safety in the case of absence of EUTRAN coverage (subject to regional regulation and operator policy, and limited to specific public-safety designated frequency bands and terminals) are under discussion.

In particular, the scope of discussion of ProSe by 3GPP assumes that proximity-based application/service is provided via LTE or WLAN, and that discovery and communication are performed between devices under the control of an operator/network.

Figure 2:
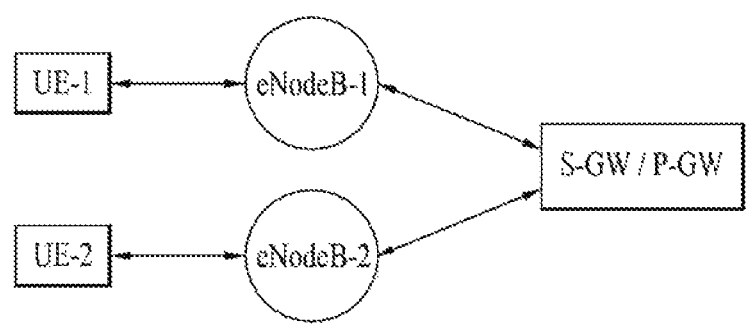
FIG. 2 is a view illustrating a default data path for communication between two UEs in an EPS.

FIG. 2 is a view illustrating a default data path for communication between two UEs in an EPS. That is, FIG. 2 illustrates an exemplary data path between UE-1 and UE-2 in a general case of no ProSe between UE-1 and UE-2. This default path goes via a base station (e.g., eNodeB or Home eNodeB) and gateway nodes (e.g., EPC or operator network). For example, as illustrated in FIG. 2, when UE-1 and UE-2 exchange data, data from UE-1 may be transmitted via eNodeB-1, S-GW/P-GW, and eNodeB-2 to UE-2 and, likewise, data from UE-2 may be transmitted via eNodeB-2, S-GW/P-GW, and eNodeB-1 to UE-1. Although UE-1 and UE-2 are camped on different eNodeBs in FIG. 2, UE-1 and UE-2 may be camped on the same eNodeB. In addition, although the two UEs are served by the same S-GW and P-GW in FIG. 2, various combinations of services are allowed here. For example, the UEs may be served by the same S-GW and different P-GWs, by different S-GWs and the same P-GW, or by different S-GWs and different P-GWs.

In the present invention, this default data path may be referred to as an infrastructure path, infrastructure data path, or infrastructure communication path. In addition, communication through the infrastructure data path may be referred to as infrastructure communication.

Figure 3:
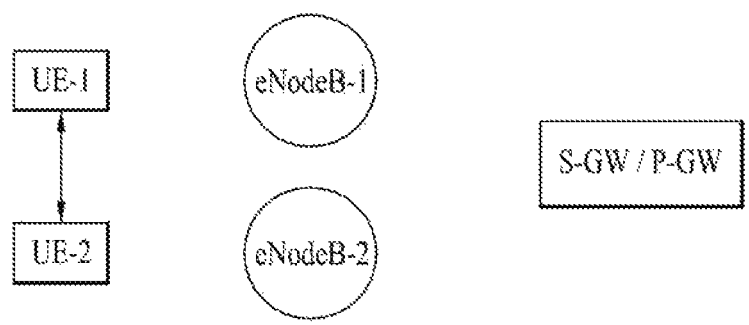
FIG. 3 is a view illustrating a direct mode data path between two UEs based on ProSe.
Figure 3:
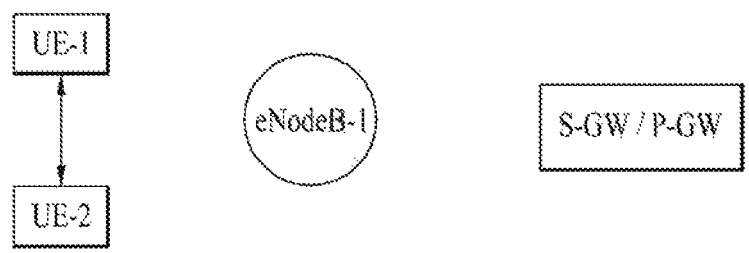

FIG. 3 is a view illustrating a direct mode data path between two UEs based on ProSe. This direct mode communication path does not go via a base station (e.g., eNodeB or Home eNodeB) and gateway nodes (e.g., EPC).

FIG. 3(a) illustrates an exemplary case in which UE-1 and UE-2 are camped on different eNodeBs (e.g., eNodeB-1 and eNodeB-2) and exchange data via a direct mode communication path. FIG. 3(b) illustrates an exemplary case in which UE-1 and UE-2 are camped on the same eNodeB (e.g., eNodeB-1) and exchange data via a direct mode communication path.

It should be noted that a data path of a user plane is directly established between UEs without going via a base station or a gateway node as illustrated in FIG. 3, but a control plane path can be established via a base station and a core network. Control information exchanged through the control plane path may be information about session management, authentication, authorization, security, charging, etc. In the case of ProSe communication between UEs served by different eNodeBs as illustrated in FIG. 3(a), control information for UE-1 may be exchanged via eNodeB-1 with a control node (e.g., MME) of a core network, and control information for UE-2 may be exchanged via eNodeB-2 with a control node (e.g., MME) of a core network. In the case of ProSe communication between UEs served by the same eNodeB as illustrated in FIG. 3(b), control information for UE-1 and UE-2 may be exchanged via eNodeB-1 with a control node (e.g., MME) of a core network.

Figure 4:
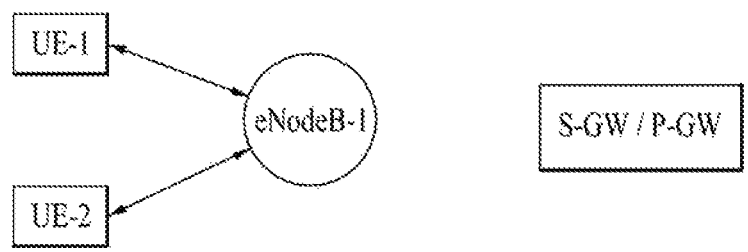
FIG. 4 is a view illustrating a locally-routed data path between two UEs based on ProSe.

FIG. 4 is a view illustrating a locally-routed data path between two UEs based on ProSe. As illustrated in FIG. 4, a ProSe communication data path between UE-1 and UE-2 is established via eNodeB-1 but does not go via a gateway node (e.g., EPC) operated by an operator. For a control plane path, if a locally-routed data path is established between UEs served by the same eNodeB as illustrated in FIG. 4, control information for UE-1 and UE-2 may be exchanged via eNodeB-1 with a control node (e.g., MME) of a core network.

In the present invention, the communication path described above in relation to FIGS. 3 and 4 may be referred to as a direct data path, data path for ProSe, ProSe-based data path, or ProSe communication path. In addition, communication through this direct data path may be referred to as direct communication, ProSe communication, or ProSe-based communication.

As described above, only potential use cases and requirements of ProSe, basic data paths, and control paths are under discussion, and details for the architecture and operation of a 3GPP network for supporting ProSe are not prepared. The present invention proposes specific examples of control plane signaling for enabling control of ProSe by an operator/network.

Network-Initiated Control Mechanism for Supporting ProSe

The present invention proposes network-initiated control mechanisms for supporting ProSe. For example, the present invention proposes a scheme for detecting/discovering that ProSe is enabled between UEs (or, users or subscribers), by a network, a scheme for setting up a direct data path between UEs under the control of a network, a scheme for receiving a direct data path setup result and ProSe related information from a UE and utilizing the result and information in ProSe related control, e.g., charging, by a network, etc.

Cases to which a network-initiated control mechanism for supporting ProSe on a control plane according to the present invention is applicable may be assumed as the following cases.

When the status of a network is changed, the network-initiated ProSe related control mechanism may be applied. For example, although UEs are already present at ProSe-enabled locations, when ProSe is not permitted (required) due to the status of a network (e.g., a status in which a RAN or core network is not congested), if the status of the network is changed (e.g., a status in which a RAN or core network is congested), ProSe of the UEs may be permitted for traffic offloading.

Alternatively, when the possibility that the status of a UE is changed is high or when a network instructs/requests to change the status of the UE, the network-initiated ProSe related control mechanisms may be applied. For example, while a ProSe-capable UE has disabled a ProSe function or use for battery saving, privacy, etc., if the UE is in idle mode, a network may notify the UE that ProSe is enabled. That is, it may be expressed that a network triggers use of ProSe by a UE. The triggering of the network may include informing a UE having ProSe capability that downlink data can be received by the UE using ProSe (e.g., through direct communication with a UE for transmitting the downlink data), when the downlink data directed to the UE occurs. Alternatively, the triggering of the network may include informing a UE having ProSe capability if ProSe with another UE(s) is enabled, even when downlink data directed to the UE does not occur.

The above-described cases to which the network-initiated ProSe related control mechanism is applicable are merely exemplary, and the schemes proposed by the present invention are also applicable to other cases.

In addition, the network-initiated ProSe related control mechanism proposed by the present invention may be configured as one of or a combination of two or more of 1) an operation for detecting/discovering ProSe availability between UEs by a network, 2) an operation for informing a UE of ProSe permissibility by a network, 3) a signaling operation for setting up a direct data path between UEs, 4) an operation for performing direct data communication between UEs, and 5) an operation for receiving ProSe performance result information from a UE. A detailed description is now given of operations 1) to 5) proposed by the present invention.

Embodiment 1

Embodiment 1 relates to an operation for detecting/discovering ProSe availability between UEs by a network.

When a UE moves to a new area or is powered on, the UE performs an operation such as attach, tracking area update (TAU), cell reselect or handover. Due to the above operation, the UE may inform a network of its location information, etc. When a plurality of UEs perform the above operation, the network may determine between which UEs ProSe is enabled. This may be called a network-initiated ProSe detection/discovery operation.

In network-initiated ProSe detection/discovery, for example, the network may basically determine ProSe permissibility/availability based on the locations of UEs. In addition, although UEs are present at ProSe-enabled locations, when ProSe is not permitted due to the status of the network (e.g., a status in which a RAN or core network is not congested), the network may determine whether ProSe of the UEs is permitted if the status of the network is changed (e.g., a status in which a RAN or core network is congested).

The determining of ProSe permissibility between UEs by the network may be performed by a control node. For example, a network control node (e.g., MME) may detect/discover whether ProSe is enabled between UEs (e.g., UE-1 and UE-2) (or determine ProSe permissibility) based on predetermined information directly or indirectly acquired from a UE or another network node (e.g., HSS) (hereinafter referred to as "ProSe basis information").

Although MME is described as a representative example of a network control node which determines ProSe permissibility herein, the scope of the present invention is not limited thereto and another network control node or an eNodeB may perform the same operation. That is, the network control node refers to an arbitrary network node capable of maintaining/managing/transmitting ProSe basis information, and determining ProSe permissibility based on the ProSe basis information. A network node (or network control node) mentioned in the present invention may correspond to at least one of, for example, a network node for managing mobility, e.g., MME or SGSN, a network node for maintaining subscriber information, e.g., HSS, a network node for managing ProSe related information, e.g., ProSe server, an Authentication Authorization Accounting (AAA) server or AAA proxy involved in authentication, etc., an Access Network Discovery and Selection Function (ANDSF) entity, a gateway node, e.g., P-GW, and an eNodeB.

The ProSe basis information may be stored in one or more network nodes. For example, the ProSe basis information may be stored in MME as context, in HSS as subscriber information, in a third network node (e.g., ProSe server), or in two or more of the above network nodes.

The ProSe basis information may explicitly or implicitly indicate information used to determine ProSe permissibility by MME, determined as a piece of or a combination of two or more pieces of information provided from another network node, or correspond to information which is previously configured without being provided from another network node.

A description is now given of examples of the ProSe basis information, and the ProSe basis information may be configured as one of or a combination of two or more of the following examples.

Location information transmitted from UEs. Location information of a UE may be reported to a network during a typically defined operation procedure such as attach/TAU/cell reselect/handover, etc., or correspond to measurement information which is additionally reported by the UE. For example, MME may consider whether UE-1 and UE-2 are camped on the same cell, whether UE-1 and UE-2 have the same Tracking Area Identity (TAI) or area code, etc.

ProSe capability information and/or availability information received from a ProSe-enabled UE. For example, ProSe capability information of a UE may simply correspond to whether the UE has ProSe capability itself, or configured as a piece of or a combination of two or more pieces of information indicating various properties of ProSe related operation. In addition, the ProSe availability information may indicate an enabled/disabled state of the ProSe capability (or each combination of two or more pieces of capability information).

Subscriber information of a ProSe-enabled UE.

Preference information of a ProSe-enabled UE (or corresponding user/subscriber) and/or information about a preset condition for reflecting corresponding preference.

Information indicating whether a UE is capable of performing proximity-based service/application. Additionally, information indicating an enabled/disabled state of corresponding capability if the UE is capable of performing proximity-based service/application.

Information about the policy of a home operator and/or a visitor operator, and roaming agreement.

Information indicating whether a network supports proximity-based service/application. For example, information about the configuration of a ProSe related MME or an eNodeB.

Information for identifying a specific device(s) (e.g., UE identifier).

Information for identifying a device(s) which belongs to a specific user(s) (e.g., user identifier).

Information for identifying a device(s) which belongs to a specific group(s) (e.g., group identifier). Here, a group may be a user group or a commercially configured group (e.g., restaurant or theater group).

All device(s) detectable/discoverable by a network.

A list of UEs which are in communication with each other.

Information about ProSe relationship of UEs.

Information about ProSe relationship between a UE/user which transmits downlink data, and a UE/user which receives the downlink data.

Information about the status of a network. For example, basic information used to determine an overall network congestion status, or congestion statuses of network nodes related to ProSe control, e.g., MME and eNodeB.

A ProSe related request received from a UE which transmits downlink data.

ProSe related information received from a third network node (e.g., ProSe server).

The ProSe basis information is described above on the assumption that a network control node which determines/evaluates ProSe permissibility is MME. When an eNodeB or a third network node determines/evaluates ProSe permissibility, the ProSe basis information may be configured differently. For example, information corresponding examples of the ProSe basis information may be configured in different forms and thus used to determine/evaluate ProSe permissibility by the network control node.

The MME may determine whether ProSe of a specific UE(s) is permitted, using the above-described ProSe basis information, and thus determine whether to signal information indicating that ProSe is permitted (or ProSe is enabled), to a corresponding UE.

Embodiment 2

Embodiment 2 relates to an operation for informing a UE of ProSe permissibility by a network.

A network control node (e.g., MME) may signal an indication about ProSe permissibility (or availability) to UE-1 or UE-2. This indication may be signaled from a network even without a request of a UE, and called a ProSe use/permission indication provided in an unsolicited manner. This indication about ProSe availability/permissibility of the network may be configured as information explicitly or implicitly indicating one or more of A to C described below.

A. An indication of a network to UE-1 (or UE-2) to use or not to use ProSe with UE-2 (or UE-1) (or, an indication of a network to UE-1 (or UE-2) that ProSe with UE-2 (or UE-1) is permitted or not permitted).

B. An indication of a network to UE-1 (or UE-2) to perform or not to perform direct communication with UE-2 (or UE-1) (or, an indication of a network to UE-1 (or UE-2) that direct communication with UE-2 (or UE-1) is permitted or not permitted).

C. An indication of a network to UE-1 (or UE-2) to set up or not to set up a direct data path with UE-2 (or UE-1) (or, an indication of a network to UE-1 (or UE-2) that direct data path setup to UE-2 (or UE-1) is requested or not requested).

One of, two or more of, or a combination of two or more of A, B and C may be transmitted. For example, A, B and C may be signaled as a single message. Alternatively, A may be transmitted as a single message and B and C may be transmitted as another single message. Otherwise, A, B and C may be signaled as respective messages. In addition, when A, B and C are signaled using a plurality of messages, the messages may be transmitted in parallel, or sequentially transmitted in such a manner that one message is completely exchanged (e.g., a request of a UE is transmitted to a network and a response of the network is transmitted to the UE) and then another message is exchanged. Here, the order of the sequentially transmitted messages may be configured based on the number of cases. Alternatively, A, B and C may be transmitted as independent messages upon a specific event (e.g., application request, etc.) of a UE or network.

Since UEs to which the indications about availability/permissibility are signaled can be configured independently, the UEs to which the indications are signaled may be the same or different. For example, a UE(s) to which the indication B about direct communication is signaled is not always the same as a UE(s) to which the indication A about use (or permission) of ProSe is signaled.

Hereinafter, for convenience of explanation, an indication about use/permission of ProSe, an indication about use/permission of direct communication and an indication about direct data link setup performing/request, which are provided from a network to a UE, are collectively referred to as "ProSe permissibility indication information".

The ProSe permissibility indication information may be configured as a piece of or a combination of two or more pieces of information described below.

Parameter or indication information indicating that ProSe is enabled.

Parameter or indication information indicating a user that ProSe is enabled.

Information about a use level of ProSe. For example, this information may refer to information indicating whether a UE shall, should, or may perform ProSe (or direct communication, or direct data path setup).

Information about an opposite UE for ProSe or direct communication. If a plurality of opposite UEs are present, information indicating a plurality of UEs may be included. For example, when a network may detect/discover that UE-1 is communicable with UE-2, UE-3 and UE-4 for ProSe and ProSe is desired therebetween, the ProSe permissibility indication information provided to UE-1 may include information about UE-2, UE-3 and UE-4.

Information about media or contents to be communicated or communicable using ProSe or a direct data path. For example, information about a media or content type for which ProSe permissibility is indicated (e.g., ProSe use/permission may be indicated for a part or all of audio, video, image and text).

Information about applications for communication desired or enabled using ProSe or a direct data path. For example, information about an application type for which ProSe permissibility is indicated.

Information about services for communication desired or enabled using ProSe or a direct data path. For example, information about a service type for which ProSe permissibility is indicated (e.g., ProSe use/permission may be indicated for a part or all of an instant messaging service, a file sharing service, a public safety service, a chatting service and a social networking service).

Information about directivity for communication desired or enabled using ProSe or a direct data path. For example, ProSe use/permission may be indicated for a part or all of unidirectional communication from UE-1 to UE-2, unidirectional communication from UE-2 to UE-1, bidirectional communication between UE-1 and UE-2, and broadcasting from UE-1 to other UEs).

Information about the amount of data (i.e., the volume of traffic) for communication desired or enabled using ProSe or a direct data path.

Information about an access type (e.g., E-UTRAN, WLAN, etc.) to be used or usable for ProSe or direct communication.

One or more pieces of the above-described information may be configured individually or in combination and included in the ProSe permissibility indication information.

Additionally, the ProSe permissibility indication information may further include various types of information required to set up a direct data path. Information required to set up a bearer for media to be communicated using ProSe or a direct data path may include one or more of information related to Quality of Service (QoS), information related to policy control rules, and information related to charging control rules.

The information related to QoS may include QoS Class Indicator (QCI), Resource Type (e.g., Guaranteed Bit Rate (GBR) or non-GBR), Priority, Packet Delay Budget, Packet Error Loss Rate, Maximum Bit Rate (MBR), Allocation Retention Priority (ARP), Aggregated MBR (AMBR), etc.

The information related to policy control rules may include, if dynamic Policy and Charging Control (PCC) is applied, a part or all of policy control rules received from a Policy & Charging Rules Function (PCRF) entity, or policy control rules processed to be interpretable/applicable by a UE. An individual UE may perform QoS control and gating control for ProSe or a direct data path based on the received policy control rules.

The information related to charging control rules may include a part or all of charging control rules received from a network node which is in charge of online/offline charging, or charging control rules processed to be interpretable/applicable by a UE, and information indicating the condition, time, etc. for acquiring information for charging by an individual UE based on a corresponding charging control rule. Based on this information, different communication (e.g., infrastructure communication) and charging schemes may be performed for ProSe or a direct communication, and an individual UE may acquire and transmit information for charging to a network.

Additionally, the ProSe permissibility indication information may include information for identifying corresponding ProSe, direct communication, or a direct data communication path (e.g., reference number for ProSe or reference number for direct communication). The reference number for ProSe/direct communication/direct data communication path may be configured with various granularities. For example, the reference number for ProSe/direct communication may be defined with one or more granularities among a media or content type, an Access Point Name (APN), a QoS Class Identifier (QCI), a bearer or connection type, an application type, a service type, a destination domain, a UE to which the ProSe permissibility indication is signaled, an opposite UE for communication, predefined user group information, predefined subscriber group information, predefined UE group information, and a Closed Subscriber Group (CSG).

The ProSe permissibility indication information may be included in a typical message, e.g., Short Message Service (SMS) message, Non-Access Stratum (NAS) message, or Session Initiation Protocol (SIP) message, from a network to a UE, or in a message newly defined for the present invention.

A UE which has received a message including the ProSe permissibility indication information, from a network node such as MME may enable ProSe capability or availability which was disabled. In addition, the UE may activate ProSe related specific functions (e.g., a function for detecting/discovering other ProSe-enabled UEs, a detection/discovery scanning function for responding to detection/discovery of other ProSe-enabled UEs, a function for notifying a user that ProSe is enabled, etc.). Further, when a ProSe-enabled UE has enabled some ProSe related functions and disabled some other functions, the disabled functions may be enabled. For example, when a UE has enabled a function for detecting/discovering other UEs by the UE and disabled a function for permitting the other UEs to detect/discover the UE, the disabled detection/discovery permission function may be enabled. However, the scope of the present invention is not limited to the case in which a ProSe-enabled UE has disabled a part or all of ProSe functions, and includes the case in which indication information about ProSe permissibility is also transmitted to a UE which has enabled ProSe functions, and the UE changes/modifies a ProSe related operation or performs subsequent operations according to the information.

Embodiment 3

Embodiment 3 relates to a signaling operation for setting up a direct data path between UEs.

For example, UE-1 which has received an indication (or permission) message from a network node such as MME may transmit a direct data path setup request to UE-2 (or a plurality of opposite UEs) or a network.

When UE-1 transmits a direct data path setup request to an opposite UE(s), the direct data path may be set up using information related to direct data path setup (e.g., QoS, PCC information, etc.) if the information is received from the network, or using information configured in UE-1 if the information is not received from the network.

When UE-1 transmits a direct data path setup request to the network, as in Embodiment 2, a request message including information about media to be communicated (e.g., information about a media type, etc.) and information about directivity for communication (e.g., information indicating unidirectional, bidirectional, or broadcast communication, etc.) may be transmitted.

Meanwhile, the network may perform an operation for direct data path setup between UEs without receiving a direct data path setup request from a UE. The above-described direct data path setup may be initiated by the network without an explicit request of a UE based on operator policies, etc. configured in the network. If the network does not perform direct data path setup, the network may not transmit an indication/request for direct communication, which is described above in Embodiment 2, to the UE, or may transmit an indication/request for direct communication, which does not include QoS and PCC information, to the UE.

Embodiment 4

Embodiment 4 relates to an operation for performing direct data communication between UEs. As described above in relation to FIGS. 3 and 4, direct communication between UEs may be performed via or without going via an eNodeB. In addition, direct communication between UEs may be performed one or more pieces of information included in the ProSe permissibility indication information described above in Embodiment 2. For example, with respect to a media type permitted by a network, direct communication between UEs may be performed under policy rule and charging rule control provided by the network.

Embodiment 5

Embodiment 5 relates to an operation for receiving ProSe performance result information from a UE by a network.

A UE which has performed ProSe with an opposite UE(s) may report ProSe performance result information to a network (e.g., MME) based on information included in a message received from the network and/or information configured in the UE, as described above in Embodiment 2. A network node (e.g., MME) which has received the report may store received information or transmit the information to another network node (e.g., HSS, charging related node, or third node (e.g., ProSe server)) to store the information reported by the UE.

The ProSe performance result information may include one or more pieces of information described below.

Identification information of performed ProSe (e.g., reference number for ProSe).

Identification information of direct communication (e.g., reference number for direct communication).

Identification information of a direct data path (e.g., reference number of a direct data path).

Information indicating success or failure of direct data path setup.

Information about the amount of data and/or time for communication through a direct data path.

Charging information (e.g., time for which a direct data path is maintained, etc.).

The types of media (or contents) communicated through a direct data path.

Information about directivity of a direct data path (e.g., unidirectional communication from UE-1 to UE-2, unidirectional communication from UE-2 to UE-1, bidirectional communication between UE-1 and UE-2, or broadcasting from UE-1 to other UEs).

Information about an access type (e.g., E-UTRAN, WLAN, etc.) used for a direct data path.

Information about the number and types of bearers used for a direct data path.

The above-described ProSe performance result information may be reported to a network node (e.g., MME) immediately after direct communication is completed, or an accumulated result of all cases for direct communication performed between UEs until performance of direct communication between UEs is no more possible, to a network node (e.g., MME).

One of a plurality of UEs which have performed ProSe may report the ProSe performance result information to the network. Here, the UE may be a UE which has served as a master in ProSe, a UE which has served as an initiator of direct communication, a UE which has received ProSe permissibility indication information from the network as described above in Embodiment 2, or a UE which has transmitted data to an opposite UE in direct communication. Alternatively, two or more of a plurality of UEs which have performed ProSe may report the ProSe performance result information to the network.

If direct data path setup is performed (or initiated) by the network as described above in Embodiment 3, UEs which have terminated direct communication may transmit a direct data path release request to the network. Here, the ProSe performance result information may be replaced by the direct data path release request or transmitted to the network using the release request.

The principle of the present invention has been described above in Embodiments 1 to 5 using an example in which, while UEs are not performing communication or are performing a typical type of communication (e.g., infrastructure communication), ProSe is enabled and thus the UEs perform direct communication. However, the scope of the present invention is not limited thereto and the principle of the present invention may be equally applied to the case in which, while UEs are present at ProSe-enabled locations or are performing direct communication, ProSe is no more possible. For example, one of or a combination of two or more of 1) an operation for determining ProSe permissibility by acquiring ProSe basis information including location information, etc. of UEs which are performing direct communication, from a network, 2) an operation for transmitting ProSe permissibility indication information including information indicating a determination result if ProSe is not permitted, to a UE by the network, 3) an operation for signaling a request to release a direct data communication path to the UE based on a direct data communication path release request received from the UE, or in an unsolicited manner by the network, 4) an operation for releasing the direct data communication path by the UEs, 5) an operation for receiving ProSe performance result information from the UE(s) by the network may be performed.

The ProSe related information proposed in Embodiments 1 to 5 may be exchanged between a network node and a UE using a typical signaling message (e.g., attach request/accept/complete, TAU request/accept, service request, extended service request, PDN connection request, etc.) or in a manner to be included in the typical signaling message.

For example, the ProSe related information may be defined as a new field/parameter in a typical signaling message, or by reusing or extending a typical field/parameter. Alternatively, unlike a typically defined signaling message, the ProSe related information may be transmitted and received using a message newly defined for the present invention.

Various embodiments of the present invention are applicable to all UMTS/EPS mobile communication systems including 3GPP LTE/EPC networks, other 3GPP access networks (e.g., UTRAN/GERAN/E-UTRAN), and non-3GPP access networks (e.g., WLAN, etc.), and also applicable to all other wireless mobile communication system environments to which control of a network is applied.

Figure 5:
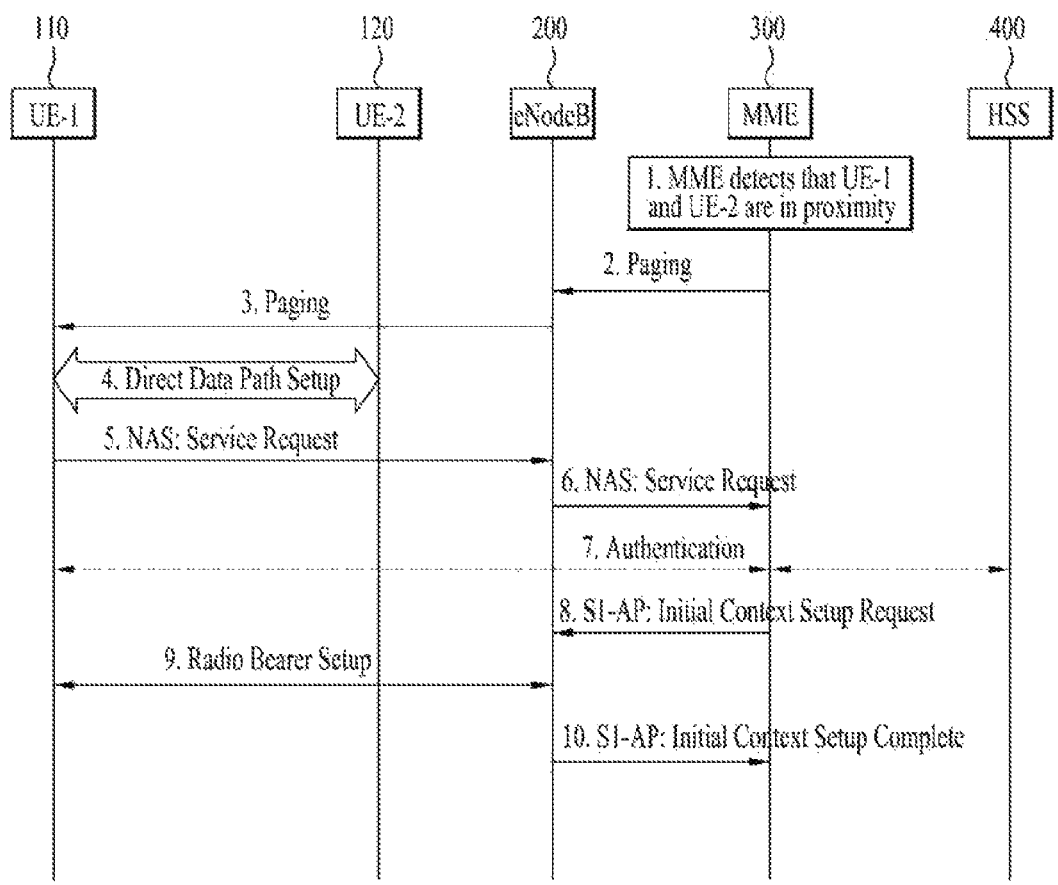
FIG. 5 is a view for describing a network-initiated control method for providing ProSe, according to an embodiment of the present invention.

FIG. 5 is a view for describing a network-initiated control method for providing ProSe, according to an embodiment of the present invention. FIG. 5 illustrates an exemplary case in which ProSe related information is signaled using a service request procedure.

In step 1 of FIG. 5, an MME 300 may detect that ProSe is enabled between a UE-1 110 and a UE-2 120, or discover UEs capable of performing ProSe with each other. The MME 300 may determine whether ProSe is permitted between UEs based on ProSe basis information which is previously received from the UE-1 110 and/or the UE-2 120, or another network node, or previously configured. Reference can be made to Embodiment 1 for details of the operation of the MME 300.

In steps 2 and 3 of FIG. 5, if the MME 300 determines to perform direct communication by the UEs in step 1, the MME 300 may transmit a paging message via an eNodeB 200 to the UE-1 110 by including ProSe permissibility indication information in the paging message.

Here, the paging message carrying the ProSe permissibility indication information may include a paging request for performing a typical type of communication (e.g., infrastructure communication) with the UE-2 120 by the UE-1 110. For example, both direct communication and typical infrastructure communication between the UE-1 110 and the UE-2 120 are desired, both of requests for these two types of communication may be included in the paging message.

In addition, various types of information required for direct communication may be transmitted from the MME 300 to the UE-1 110 by adding a new field/parameter to or reusing a typical field/parameter of the paging message of steps 2 and 3, or using a newly defined message other than the paging message. Reference can be made to Embodiment 2 for details of the ProSe permissibility indication information and the information required for direct communication.

In steps 4 of FIG. 5, the UE-1 110 which has indicated by the MME 300 may transmit a direct data path setup request to the UE-2 120 or a network. Alternatively, the network may initiate direct data path setup between the UE-1 110 and the UE-2 120. As such, a direct data path may be set up and direct communication may be performed between the UE-1 110 and the UE-2 120.

In steps 5 and 6 of FIG. 5, the UE-1 110 may transmit ProSe performance result information to the MME 300 using a service request message. The service request message may be transmitted for a typically defined purpose as well as a purpose of transmitting the ProSe performance result information. Accordingly, the ProSe performance result information may be transmitted using a newly defined message or in a manner to be included in a typically defined message.

Steps 7 to 10 of FIG. 5 show a general service request procedure, and a subsequent procedure may be performed or terminated as necessary.

Figure 6:
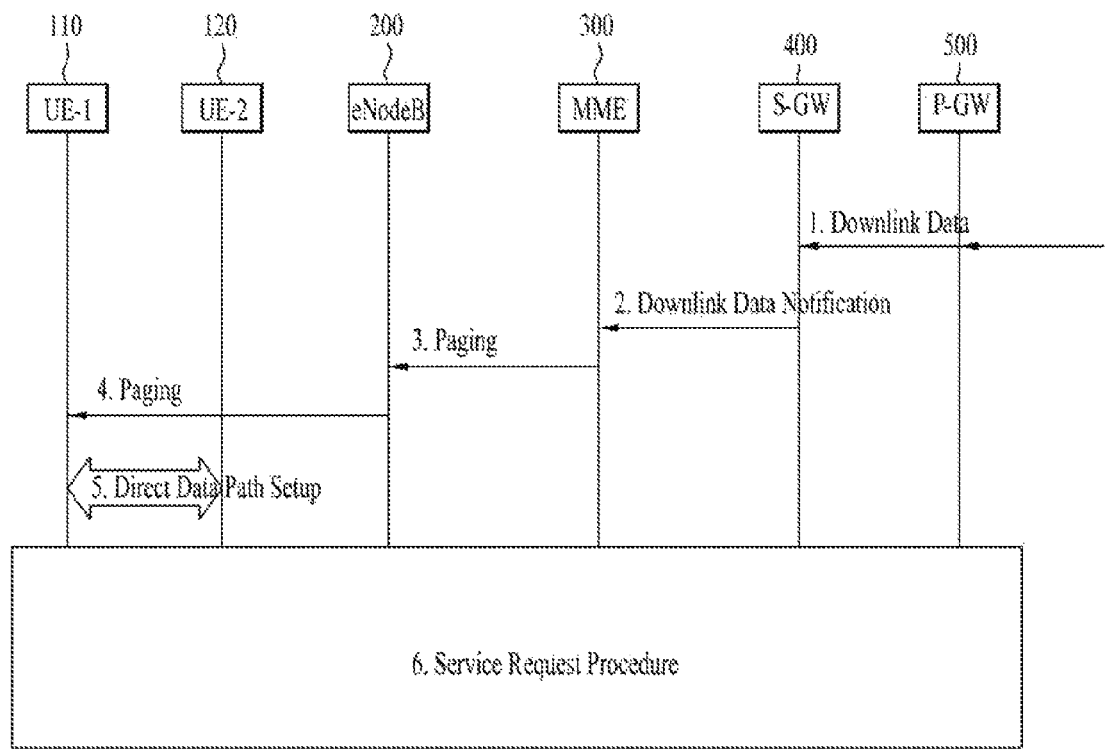
FIG. 6 is a view for describing a network-initiated control method for providing ProSe, according to another embodiment of the present invention.

FIG. 6 is a view for describing a network-initiated control method for providing ProSe, according to another embodiment of the present invention. FIG. 6 illustrates an exemplary case in which downlink data directed to a ProSe-enabled UE occurs when the ProSe-enabled UE is in idle mode.

In steps 1 and 2 of FIG. 6, if data to be transmitted to a UE-1 110 which is in idle mode occurs from another network node, the data reaches an S-GW 400 via a P-GW 500 from the network node which is a source (e.g., the source of the data to be transmitted to the UE-1 110 may be a UE-2 120 but is not limited thereto). The S-GW 400 may notify the MME 300, which controls the UE-1 110, that downlink data directed to the UE-1 110 has occurred.

In steps 3 and 4 of FIG. 6, to transmit the downlink data to the UE-1 110 in idle state, the MME 300 first transmits a paging message to the UE-1 110 via an eNodeB 200, and information indicating that ProSe is enabled may be included in the paging message. Here, reference can be made to Embodiment 1 for details of an operation for detecting/discovering that ProSe is enabled between the UE-1 110 and the UE-2 120 and determining ProSe permissibility by the MME 300. In addition, reference can be made to Embodiment 2 for details of an operation for transmitting ProSe permissibility indication information to the UE-1 110 by the MME 300.

In step 5 of FIG. 6, the UE-1 110 which has received the paging message may enable disabled ProSe function or availability, and set up a direct data path with the UE-2 120 on a user plane. This procedure may be performed in such a manner that a UE forms an infrastructure data path with a network and then the generated path is switched to a direct data path, or by directing forming a direct data path without forming an infrastructure data path.

Here, when the UE-1 110 determines whether to form an infrastructure data path with a network and then switch it to a direct data path, or to directly form a direct data path, information previously configured in the UE-1 110 may be used or the network may transmit information indicating a direct data path setup scheme to the UE-1 110. The above information may be transmitted using the paging message together with information for enabling ProSe function or availability, or previously transmitted to the UE-1 110 in an Open Mobile Alliance Device Management (OMA DM) or Over The Air (OTA) manner. Alternatively, the above information may be dynamically updated during communication of the UE-1 110.

In addition, the downlink data packet directed to the UE-1 110 and stored in the S-GW 400 during paging is performed may be transmitted via the network to the UE-1 110 or transmitted through a direct data path to the UE-1 110 which is a destination of the data from the UE-2 120 which is a source of the data. The latter case of transmission may be performed when a network node (e.g., MME 300, S-GW 400 or P-GW 500) or the UE-1 110 which receives the data requests or indicates to transmit the data using the direct data path from the first packet.

In step 6 of FIG. 6, the UE-1 110 may transmit ProSe performance result information to the MME 300 by including the result information in a service request message. The service request message may be transmitted for a typically defined purpose as well as a purpose of transmitting the ProSe performance result information. Accordingly, the ProSe performance result information may be transmitted using a newly defined message or in a manner to be included in a typically defined message. A subsequent service request procedure may be performed or terminated as necessary.

The above embodiment of the present invention is described using an example in which a ProSe-enabled UE is in idle mode, but is not limited thereto. The principle thereof is equally applicable to the case in which the UE is in active mode.

According to the network-initiated control mechanism for supporting ProSe proposed by the present invention, loads of a network may be flexibly reduced (or offloaded) according to a change in the network environment and various proximity-based services may be provided to users with efficient communication between ProSe UEs. In addition, even when a ProSe-enabled UE has disabled a ProSe function or availability for battery saving, privacy, etc., loads of a network may be reduced using an effective control plane control mechanism and various proximity-based services may be provided to users with efficient communication between ProSe UEs.

The above-described embodiments of the present invention may be applied independently or two or more embodiments may be applied simultaneously.

Figure 7:
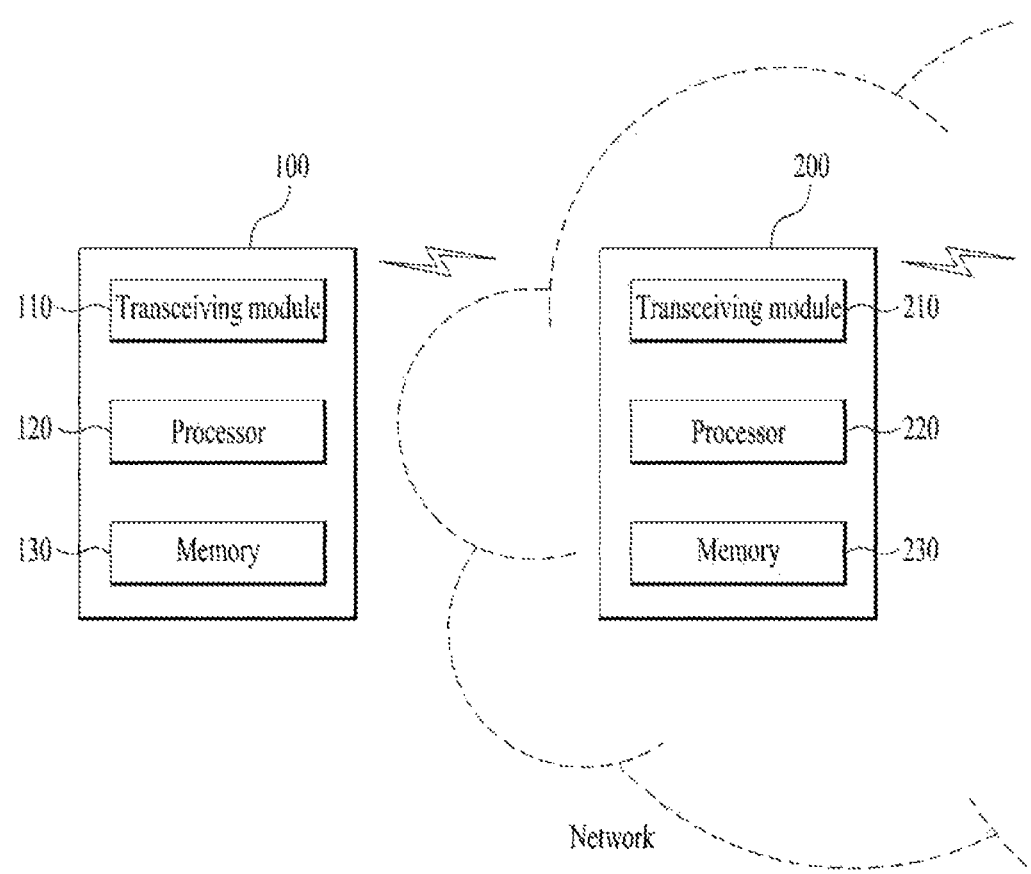
FIG. 7 is a view illustrating the configurations of a UE and a network node according to an embodiment of the present invention.

FIG. 7 is a view illustrating the configurations of a UE and a network node according to an embodiment of the present invention.

Referring to FIG. 7, the UE 100 may include a transceiver module 110, a processor 120 and a memory 130. The transceiver module 110 may be configured to transmit and receive various types of signal, data and information to and from an external device. The UE 100 may be connected to the external device by wire and/or wirelessly. The processor 120 may be configured to provide overall control to the UE 100 and process information, etc. to be transmitted to or received from the external device by the UE 100. The memory 130 may store the processed information, etc. for a predetermined time and replaced by an element such as a buffer (not shown).

The UE 100 may be configured to participate in ProSe according to a result of network-initiated ProSe availability detection or ProSe UE discovery. The processor 120 of the UE 100 may be configured to transmit ProSe basis information to the network node 200 using the transceiver module 110. The processor 120 may be configured to receive ProSe permissibility indication information from the network node 200 using the transceiver module 110. The processor 120 may be configured to process signaling for performing direct data path setup with another UE. The processor 120 may be configured to perform direct communication with the other UE using the transceiver module 110. The processor 120 may be configured to transmit ProSe performance result information to the network node 200 using the transceiver module 110.

Referring to FIG. 7, the network node 200 may include a transceiver module 210, a processor 220 and a memory 230. The transceiver module 210 may be configured to transmit and receive various types of signal, data and information to and from an external device. The network node 200 may be connected to the external device by wire and/or wirelessly. The processor 220 may be configured to provide overall control to the network node 200 and process information, etc. to be transmitted to or received from the external device by the network node 200. The memory 230 may store the processed information, etc. for a predetermined time and replaced by an element such as a buffer (not shown).

The network node 200 may be configured to support ProSe between a plurality of UEs. The processor 220 of the network node 200 may be configured to receive ProSe basis information from the UE 100 or another network node using the transceiver module 210. The processor 220 may be configured to transmit ProSe permissibility indication information to the UE 100 using the transceiver module 210. The processor 220 may be configured to process signaling for supporting direct data path setup between the UE 100 and another UE. The processor 220 may be configured to receive ProSe performance result information from the UE 100 using the transceiver module 210.

In addition, for the detailed configurations of the UE 100 and the network node 200, the above-described embodiments of the present invention may be applied independently or two or more embodiments may be applied simultaneously, and repeated descriptions are omitted for clarity.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. A software code may be stored in the memory 130 or 230 and executed by the processor 120 or 220. The memory 130 or 230 may be located inside or outside the processor 120 or 220 and exchange data with the processor 120 or 220 via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The embodiments of the present invention described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

The invention claimed is:

1. A method of a network node supporting proximity service (ProSe) between at least a first user equipment (UE) and a second UE in a wireless communication system, the method comprising:
   receiving ProSe information;
   determining whether the first UE is authorized to use the ProSe;
   transmitting a paging message including ProSe permissibility indication information to the first UE when the first UE is authorized to use the ProSe and the first UE is enabled for the ProSe; and
   receiving ProSe performance result information from the first UE after the ProSe is performed,
   wherein the ProSe is performed by using a direct data path setup request between the first UE that received the paging message and the second UE,
   wherein the ProSe information includes network congestion information related to each of the plurality of UEs, operator policy information, and network ProSe capability information, and
   wherein the ProSe information further includes at least subscriber information, preference information, user identification information, group identification information, a list of other UEs, or ProSe relationship information with the other UEs.

2. The method according to claim 1, wherein the ProSe information is received from the first UE.

3. The method according to claim 1, further comprising storing the received ProSe information.

4. The method according to claim 1, wherein the ProSe permissibility indication information indicates at least whether ProSe is enabled between the at least first and second UE, whether to perform direct communication between the at least the first and second UE or whether to set up a direct data path between the at least first and second UE.

5. The method according to claim 4, wherein the ProSe permissibility indication information includes at least information related to a media type, a content type, an application type, or a service type for ProSe, information related to a use level of ProSe, information related to another UE for ProSe, information related to directivity for ProSe, information related to an amount of data for ProSe or information related to an access type for ProSe.

6. The method according to claim 5, wherein the ProSe permissibility indication information further includes information related to at least Quality of Service (QoS), policy control rules or charging control rules.

7. The method according to claim 6, wherein the ProSe permissibility indication information further includes at least ProSe identification information, direct communication identification information or direct data communication path identification information.

8. The method according to claim 7, wherein the ProSe identification information, the direct communication identification information, and the direct data communication path identification are each defined with at least one granularity among a media or content type, an Access Point Name (APN), a QoS Class Identifier (QCI), a bearer or connection type, an application type, a service type, a destination domain, another UE for communication, predefined user group information, predefined subscriber group information, predefined UE group information, or a Closed Subscriber Group (CSG).

9. The method according to claim 1, further comprising initiating direct data path setup between the at least the first and second UE upon receiving the direct data path setup request.

10. The method according to claim 1, further comprising initiating direct data path setup between the at least the first and second UE without receiving the direct data path setup request.

11. The method according to claim 1, wherein:
   the ProSe information further includes at least location information of the at least first and second UE, ProSe capability information of the at least first and second UE or ProSe capability enabled state information of the at least first and second UE;

the ProSe capability information of the at least first and second UE indicates whether the at least first and second UE has ProSe capability; and the ProSe capability enabled state information of the at least first and second UE indicates whether the ProSe of the first UE and the second UE is enabled or disabled.

12. The method according to claim 1, further comprising receiving ProSe performance result information that includes at least direct communication identification information, direct data communication path identification information, information indicating success or failure of setup of the direct data path, information related to an amount of data for communication through the direct data path, information related to time for which the direct data path is maintained, information related to a type of media or contents communicated through the direct data path, information related to directivity of the direct data path, information related to an access type used for the direct data path or information related to a number and types of bearers used for the direct data path.

13. The method according to claim 1, wherein the network node comprises at least a Mobility Management Entity (MME), a Serving GPRS (General Packet Radio Service) Supporting Node (SGSN), an evolved Node B (eNodeB) or a ProSe server.

14. A network node for supporting proximity service (ProSe) between at least a first user equipment (UE) and a second UE in a wireless communication system, the network node comprising:
  a transceiver configured to transmit and receiving receive signals between the network node and an external device; and
  a processor configured to:
  control the transceiver to receive ProSe information;
  determine whether the first UE is authorized to use the ProSe;
  control the transceiver to transmit a paging message including ProSe
  permissibility indication information to the first UE when the first UE is authorized to use the ProSe and the first UE is enabled for the ProSe; and
  control the transceiver to receive ProSe performance result information from the first UE after the ProSe is performed,
  wherein the ProSe is performed by using a direct data path setup request between the first UE that received the paging message and the second UE,
  wherein the ProSe information includes network congestion information related to each of the plurality of UEs, operator policy information, and network ProSe capability information, and
  wherein the ProSe information further includes at least subscriber information,
  preference information, user identification information, group identification information, a list of other UEs, or ProSe relationship information with the other UEs.

15. The network node according to claim 14, wherein the processor is further configured to store the received ProSe information.

16. The network node according to claim 14, wherein the ProSe permissibility indication information indicates at least whether ProSe is enabled between the at least first and second UE, whether to perform direct communication between the at least the first and second UE or whether to set up a direct data path between the at least first and second UE.

17. The network node according to claim 14, wherein the processor is further configured to initiate direct data path setup between the at least the first and second UE upon receiving the direct data path setup request from at least the first or second UE.

18. The network node according to claim 14, wherein the processor is further configured to initiate direct data path setup between the at least the first and second UE without receiving the direct data path setup request.

19. The network node according to claim 14, wherein:
  the ProSe information further includes at least location information of the at least first and second UE, ProSe capability information of the at least first and second UE or ProSe capability enabled state information of the at least first and second UE;
  the ProSe capability information of the at least first and second UE indicates whether the at least first and second UE has ProSe capability; and
  the ProSe capability enabled state information of the at least first and second UE indicates whether the ProSe of the first UE and the second UE is enabled or disabled.

20. The network node according to claim 14, wherein the processor is further configured to control the transceiver to receive ProSe performance result information that includes at least direct communication identification information, direct data communication path identification information, information indicating success or failure of setup of the direct data path, information related to an amount of data for communication through the direct data path, information related to time for which the direct data path is maintained, information related to a type of media or contents communicated through the direct data path, information related to directivity of the direct data path, information related to an access type used for the direct data path or information related to a number and types of bearers used for the direct data path.

* * * * *